United States Patent [19]

Kreuzmann

[11] 4,412,861
[45] Nov. 1, 1983

[54] METHOD FOR THE RECOVERY OF URANIUM VALUES FROM URANIUM TETRAFLUORIDE

[75] Inventor: Alvin B. Kreuzmann, Cincinnati, Ohio

[73] Assignee: The United States of America as represented by the U.S. Department of Energy, Washington, D.C.

[21] Appl. No.: 437,082

[22] Filed: Oct. 27, 1982

[51] Int. Cl.$^3$ ............................................. C22B 60/02
[52] U.S. Cl. .................................... 75/84.1 R; 423/3; 423/18; 423/20; 423/253
[58] Field of Search ....................... 423/3, 20, 18, 253; 75/84.1 R

[56] References Cited

U.S. PATENT DOCUMENTS

| | | | |
|---|---|---|---|
| 2,733,125 | 1/1956 | Spiegler | 423/253 X |
| 2,795,499 | 6/1957 | Peterson | 75/84.1 R |
| 3,288,595 | 11/1966 | Reichard | 75/84.1 R |
| 3,842,155 | 10/1974 | Muller et al. | 423/253 X |
| 4,012,493 | 3/1977 | Layne et al. | 75/84.1 R X |

OTHER PUBLICATIONS

Chemical Abstracts #84: 127,823k, "Reaction of Platonium, Uranium, and Rare Earth Fluorides with Certain Metal Oxides in Fluoride Melts".
Chemical Abstracts #89: 32,737z, "Dissolution of Uranium in Calciothermic and Magnesiothermic Slags".

Primary Examiner—Deborah L. Kyle
Assistant Examiner—Matthew A. Thexton
Attorney, Agent, or Firm—Fred O. Lewis; Stephen D. Hamel; Richard G. Besha

[57] ABSTRACT

The invention is a novel method for the recovery of uranium from dry, particulate uranium tetrafluoride. In one aspect, the invention comprises reacting particulate uranium tetrafluoride and calcium oxide in the presence of gaseous oxygen to effect formation of the corresponding alkaline earth metal uranate and alkaline earth metal fluoride. The product uranate is highly soluble in various acidic solutions wherein the product fluoride is virtually insoluble therein. The product mixture of uranate and alkaline earth metal fluoride is contacted with a suitable acid to provide a uranium-containing solution, from which the uranium is recovered. The invention can achieve quantitative recovery of uranium in highly pure form.

12 Claims, No Drawings

METHOD FOR THE RECOVERY OF URANIUM VALUES FROM URANIUM TETRAFLUORIDE

BACKGROUND OF THE INVENTION

This invention relates generally to methods for the recovery of uranium and, more particularly, to the recovery of uranium from particulate uranium tetrafluoride. The invention was made as a result of a contract with the United States Department of Energy.

In a process for the production of uranium fuel cores for use in nuclear reactors, uranium ore concentrates are converted to highly pure $UF_4$, which is reduced to uranium metal suitable for the fabrication of cores. More specifically, the ore concentrates are treated with nitric acid, forming a solution of uranyl nitrate. The solution then is contacted with an organic solvent (tributyl phosphate and kerosene) to extract the uranium, which is then reextracted into water. The resulting uranyl nitrate solution is heated to effect conversion of the uranium to $UO_3$. The $UO_3$ then is reduced to $UO_2$, which is hydrofluorinated to $UF_4$. The $UF_4$ then is reduced to metal uranium suitable for fabrication into the cores.

In the course of the above-described process, the $UF_4$ sometimes is contaminated with $UO_2F_2$, other uranium oxides, or metallics (e.g., Ni and Fe) to the extent that it is not within process specifications. It is highly desirable that the uranium in the off-specification material be reclaimed for re-introduction into the process. Over the past thirty years, two reclamation processes has been employed occasionally, but neither has been very satisfactory. One of these processes entails pyrohydrolysis of the contaminated $UF_4$. That is, the off-specification $UF_4$ is exposed to steam and air at temperatures in the range of from 1500° F. to 1900° F., converting the $UF_4$ to HF and highly pure $U_3O_8$. The $U_3O_8$ is recycled to the above-mentioned ore-dissolution step of the above-described process. Unfortunately, the pyrohydrolysis operation is subject to several disadvantages: it involves the generation of corrosive HF, it requires very high temperatures, and it is highly energy inefficient.

The other reclamation process entails dissolution of the contaminated $UF_4$ in hot concentrated nitric acid, to which alumina has been added to complex the corrosive fluoride as $AlF_3$. The resulting uranyl nitrate and $AlF_3$ are introduced to the above-mentioned extraction system. The resulting purified uranyl nitrate is converted to highly pure $UO_3$ and recycled to the $UF_4$-production process. This mode of reclamation also is subject to several disadvantages: it is expensive, objectionable $NO_x$ is generated as a byproduct, and alumina may include crystallization in the digest liquor, limiting the amount of $UF_4$ being digested.

SUMMARY OF THE INVENTION

Accordingly, it is an object of this invention to provide a novel method for the recovery of uranium from dry, particulate $UF_4$.

It is another object to provide a novel method for the production of uranates of alkaline earth metals.

It is another object to provide a method for treating $UF_4$ contaminated with $UO_2F_2$ and/or metallic elements so that the uranium content is converted to a form amenable to processing by conventional techniques.

It is another object to provide a method for converting the uranium values in $UF_4$ to a compound having high solubility in acid solutions while converting the fluoride values to a compound having low solubility in such solutions.

Other objects and advantages of the invention will be made evident hereinafter.

In one aspect, the invention is a method for use in the recovery of uranium from tetrafluoride. The method comprises reacting particulate uranium tetrafluoride and an alkaline earth metal oxide in the presence of gaseous oxygen to form the corresponding uranate and alkaline earth metal fluoride. Uranium then is recovered from the uranate. In another aspect, the invention is a method for recovering uranium from uranium tetrafluoride, comprising providing an intimate mixture of particulate uranium tetrafluoride and an alkaline earth metal oxide, such as calcium oxide and magnesium oxide. The mixture is heated in the presence of oxygen to a temperature effecting formation of the corresponding uranate and alkaline earth metal fluoride. The resulting mixture is treated with nitric acid to effect dissolution of the uranate, following which uranium is recovered from the resulting solution. In another aspect, the invention is a method for producing an alkaline earth metal uranate. In the presence of oxygen, a particulate mixture of uranium tetrafluoride and an alkaline earth metal oxide is reacted to effect the formation of the corresponding alkaline earth metal uranate and alkaline earth metal fluoride.

DETAILED DESCRIPTION OF THE INVENTION

The invention is based on my finding that a mixture of $UF_4$ and calcium oxide (CaO) can be reacted in the presence of oxygen to produce calcium uranate ($CaU_2O_7$) and calcium fluoride ($CaF_2$). The reaction proceeds as follows:

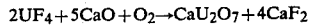

$$2UF_4 + 5CaO + O_2 \rightarrow CaU_2O_7 + 4CaF_2$$

Depending on parameters such as the surface areas of the starting materials, the reaction can be self-initiating at room temperature. The reaction products are especially amenable to uranium recovery operations entailing the formation of uranyl nitrate solutions because the $CaU_2O_7$ is highly soluble in concentrated nitric acid and because the corrosive fluoride values in the $UF_4$ are tied up as insoluble $CaF_2$.

EXAMPLE I

Samples of particulate $UF_4$ (65%-325 mesh) and CaO (93.7%-325 mesh) were blended, the CaO being provided in about twice the stoichiometric requirement with respect to formation of the uranate. The resulting mixture was roasted at 1500° F. for one hour, following which it was leached with concentrated nitric acid at about 80° C. The leachate was filtered. The filtrate analyzed as follows: 88.3 g/l uranium; 3.78 g/l fluoride, and 578 ppm calcium. The residue analyzed 49.9% calcium, 48.8% fluoride, and 0.57% uranium, representing a 99.7% uranium recovery.

EXAMPLE II

The invention was further investigated in an experiment consisting of five runs conducted for one hour and 1300° F. in a standard electric furnace (air atmosphere). Table 1 summarizes the runs. Each sample included 20 g of UF$_4$. As indicated, Run 1 was conducted with UF$_4$ alone. Run 5 was conducted with essentially a 10% excess of CaO. The product mixture was leached with concentrated nitric acid and then filtered.

plished with either hydrochloric or sulfuric acids in the presence of an oxidant. The dissolved uranium may be recovered from the solution by any suitable technique—as, for example, filtration, extraction (e.g., with a mixture of tributyl phosphate and kerosene or a suitable resin), or selective precipitation.

TABLE I

| Run No. | CaO/UF$_4$ (g/g) | Wt. CaO (g) | Time Hours | Temp. (°F.) | Residue % U | Residue Wt. (g) | Filtrate U g/l | Filtrate CaO (ppm) | Filtrate F g/l | Recovery (%) | Filtrate Volume |
|---|---|---|---|---|---|---|---|---|---|---|---|
| 1 | 0 | 0.0 | 1 | 1300 | 75.8 | 11.992 | 23.7 | 32 | 5.85 | 40.04 | 250 |
| 2 | 0.2 | 4.0 | 1 | 1300 | 25.5 | 7.903 | 49.5 | 84 | 3.67 | 86.17 | 250 |
| 3 | 0.3 | 6.0 | 1 | 1300 | 9.05 | 6.427 | 58.2 | 560 | 3.78 | 96.16 | 250 |
| 4 | 0.4 | 8.0 | 1 | 1300 | 0.56 | 7.302 | 61.2 | 790 | 3.50 | 99.73 | 250 |
| 5 | 0.5 | 10.0 | 1 | 1300 | 0.004 | 8.773 | 60.7 | 1210 | 4.34 | 99.99 | 250 |

Run 1 shows that at 1300° F. and with no CaO mixed with the UF$_4$, most of the uranium was retained in the filter cake. Runs 2, 3, and 4 show that as the proportion of CaO was increased, the recovery of uranium increased. Run 5 demonstrates that a 10% excess of CaO ensured complete reaction and a uranium recovery of 99.99%. As shown in Table I, some fluoride is solubilized; if this is considered objectionable, the fluoride can be complexed with alumina and removed by filtration.

EXAMPLE 3

The invention was investigated further in an experiment consisting of four runs conducted in an air atmosphere. The runs were conducted with a 10% excess of CaO and at four different temperatures. The results are summarized in Table II.

TABLE II

| Run No. | Temp. (°F.) | CaO/UF$_4$ (g/g) | Residue Wt. (g) | Residue U (%) | U Recovery (%) |
|---|---|---|---|---|---|
| 1 | 1000 | .5 | 19.923 | 0.005 | 99.997 |
| 2 | 1100 | .5 | 19.161 | 0.008 | 99.996 |
| 3 | 1200 | .5 | 17.791 | 0.009 | 99.995 |
| 4 | 1300 | .5 | 8.773 | 0.004 | 99.99 |

The data show that very high uranium recoveries can be achieved at various elevated temperatures. The runs described in Examples 1–3 were conducted without agitation of the UF$_4$-CaO mixture.

Referring to the invention more generally, it will be apparent to those skilled in the art that the recovery of uranium from UF$_4$ may be accomplished with various alkaline earth metal oxides and at various temperatures and times effecting conversion of the UF$_4$ to the corresponding uranate and alkaline earth metal fluoride. For example, the uranium recovery may be accomplished by reacting UF$_4$ with MgO to effect the following reaction:

$$2UF_4 + 5MgO + O_2 \rightarrow MgU_2O_7 + MgF_2$$

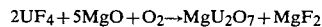

For some applications, the use of MgO as the alkaline earth metal oxide may not be as suitable as CaO because the solubility of MgF$_2$ in acid solutions exceeds that of CaF$_2$.

It is my belief that formation of the desired uranate can be achieved at temperatures ranging from ambient to above 1500° F. If desired, the particulate reactants may be agitated to promote reaction. Those skilled in the art can determine the most suitable operating conditions for a particular application of the invention by means of routine experimentation. Where the reaction product mixture is to be treated with acid to dissolve the uranium, nitric acid or any other suitale acid may be employed. For instance, dissolution may be accomplished with either hydrochloric or sulfuric acids in the presence of an oxidant. The dissolved uranium may be recovered from the solution by any suitable technique—as, for example, filtration, extraction (e.g., with a mixture of tributyl phosphate and kerosene or a suitable resin), or selective precipitation.

The foregoing description of the preferred form of the invention has been presented to best explain the principles to enable others skilled in the art to utilize the invention in various embodiments and with various modifications as are suited to a particular contemplated use. Obviously, various modifications and variations are possible in light of the teaching herein. It is intended that the scope of the invention be defined by the claims appended hereto.

I claim:

1. A method for the recovery of uranium from uranium tetrafluoride, comprising:
    reacting particulate uranium tetrafluoride and a particulate alkaline earth metal oxide in the presence of gaseous oxygen to form the corresponding alkaline earth metal uranate and alkaline earth metal fluoride, and
    recovering uranium from said uranate.

2. The method of claim 1 wherein said reacting is conducted at an elevated temperature.

3. The method of claim 1 wherein said alkaline earth metal oxide is selected from the group consisting of calcium oxide and magnesium oxide.

4. A method for the recovery of uranium from uranium tetrafluoride, comprising:
    providing a particulate mixture of uranium tetrafluoride and an alkaline earth metal oxide, said oxide being in excess of the stoichiometric value for converting the tetrafluoride to the corresponding alkaline earth metal uranate,
    reacting said mixture in the presence of gaseous oxygen to effect formation of the corresponding alkaline earth metal uranate and alkaline earth metal fluoride,
    treating the resulting mixture of said alkaline earth metal uranate and fluoride with an acidic solution effecting preferential dissolution of said uranate, and
    recovering uranium from the resulting solution of said uranate.

5. The method of claim 4 wherein said reacting operation is conducted at a temperature in the range from ambient to about 1500° F.

6. The method of claim 4 wherein said acidic solution is a solution of nitric acid.

7. A method for the production of an alkaline earth metal uranate, said method comprising:
    in the presence of gaseous oxygen, reacting a particulate mixture of uranium tetrafluoride and an alkaline earth metal oxide to form the corresponding alkaline earth metal uranate and alkaline earth metal fluoride.

8. The method of claim 7 wherein said reacting operation is effected at a temperature in the range from ambient to about 1500° F.

9. The method of claim 7 wherein said alkaline earth oxide is selected from the group consisting of calcium oxide and magnesium oxide.

10. A method for the recovery of uranium from uranium tetrafluoride, comprising:

provlding an intimate mixture of particulate uranium tetrafluoride and an alkaline earth metal oxide selected from the group consisting of calcium oxide and magnesium oxide, heating said mixture in the presence of oxygen to form the corresponding alkaline earth metal uranium and alkaline earth metal fluoride, treating the resulting mixture of said uranate and metal fluoride with an acidic solution to effect dissolution of said uranate, and recovering uranium from the resulting solution of said uranate.

11. The method of claim 10 wherein said solution is nitric acid.

12. The method of claim 10 wherein the amount of said alkaline earth metal oxide in admixture with said uranium tetrafluoride is in stoichiometric excess.

* * * * *